United States Patent
Yang

(10) Patent No.: US 9,885,354 B2
(45) Date of Patent: Feb. 6, 2018

(54) ADAPTER ASSEMBLY FOR AN INFLATING DEVICE

(71) Applicant: JIAO HSIUNG INDUSTRY CORP., New Taipei (TW)

(72) Inventor: Yung-Hao Yang, New Taipei (TW)

(73) Assignee: Jiao Hsiung Industry Corp., New Taipei (TW)

( * ) Notice: Subject to any disclaimer, the term of this patent is extended or adjusted under 35 U.S.C. 154(b) by 463 days.

(21) Appl. No.: 14/621,902

(22) Filed: Feb. 13, 2015

(65) Prior Publication Data

US 2016/0097409 A1    Apr. 7, 2016

(30) Foreign Application Priority Data

Oct. 6, 2014   (TW) .............................. 103217779 U

(51) Int. Cl.
| | |
|---|---|
| *B60C 23/02* | (2006.01) |
| *F04B 53/14* | (2006.01) |
| *B60C 23/00* | (2006.01) |
| *F04B 33/00* | (2006.01) |
| *F04B 35/04* | (2006.01) |
| *F04B 49/10* | (2006.01) |

(52) U.S. Cl.
CPC .............. *F04B 53/14* (2013.01); *B60C 23/00* (2013.01); *F04B 33/00* (2013.01); *F04B 35/04* (2013.01); *F04B 49/10* (2013.01); *F04B 2207/701* (2013.01)

(58) Field of Classification Search
None
See application file for complete search history.

(56) References Cited

U.S. PATENT DOCUMENTS 5,016,428 A * 5/1991 Helling .................. A63H 27/10
141/173
6,786,247 B1* 9/2004 Kemppainen ......... F04B 33/005
137/223
7,481,453 B2* 1/2009 Breed .................. B60N 2/0232
280/738

(Continued)

FOREIGN PATENT DOCUMENTS

CN            202073745 U   * 12/2011
JP            S54-112261 A    9/1979

*Primary Examiner* — Andre Allen
(74) *Attorney, Agent, or Firm* — Rosenberg, Klein & Lee

(57) ABSTRACT

An adapter assembly for an inflating device has a case body and a warning unit. The case body has a first chamber and a second chamber. The first chamber and the second chamber are formed in the case body and communicate with each other. The warning unit is mounted in the second chamber and has a selection module, multiple adjusting modules, a sounding body, and a cover body. The selection module is mounted in the second chamber and has multiple accommodating portions formed in the selection module. One of the accommodating portions communicates with the second chamber. The adjusting modules are respectively mounted in and communicate with the accommodating portions. The sounding body is mounted on the selection module and communicates with the accommodating portions. The cover body is mounted on the selection module, and has a least one sound hole communicating with the sounding body.

17 Claims, 12 Drawing Sheets

(56) References Cited

U.S. PATENT DOCUMENTS

| | | | |
|---|---|---|---|
| 2004/0011123 A1* | 1/2004 | Rutherford | G01L 17/00 |
| | | | 73/146 |
| 2005/0186084 A1 | 8/2005 | Wang | |
| 2008/0156406 A1* | 7/2008 | Breed | B60C 23/041 |
| | | | 152/415 |
| 2008/0216931 A1* | 9/2008 | Shoshana | B60C 29/064 |
| | | | 152/415 |
| 2013/0276217 A1* | 10/2013 | Patil | A62B 17/006 |
| | | | 2/456 |
| 2017/0173310 A1* | 6/2017 | Gregory | A61M 25/10187 |

* cited by examiner

ADAPTER ASSEMBLY FOR AN INFLATING DEVICE

BACKGROUND OF THE INVENTION

1. Field of the Invention

The present invention relates to an inflating device, and more particularly to an adapter assembly for an inflating device.

2. Description of Related Art

An inflating device is applied for inflating an inflatable product, such as: a wheel of a bike, a ball, and so on. A conversional inflating device has a base, a piston module, and a connector. The piston module is mounted on the base. The connector is mounted on the base. The user uses the piston module to compress air. The connector is connected with the inflatable product, and the pressured air can be transported into the inflatable product. A pressure gauge is further mounted on the inflating device to display the pressure of the air to the user, such that the inflatable product can be protected from excessive air pressure.

However, in use, the user cannot notice the pressure gauge at any time, such that the pressure gauge cannot provide an immediate warning effect to the user. When the pressure displayed on the pressure gauge is excessive, the user has to relief the pressure of the air in the inflatable product, such that the inflatable process may be not smooth. Furthermore, when the air pressure in the inflatable product is excessive, the inflatable product may be damaged.

SUMMARY OF THE INVENTION

The main objective of the present invention is to provide an adapter assembly for an inflating device to resolve the afore-mentioned problems.

The adapter assembly has a case body and a warning unit.

The case body has a first chamber and a second chamber. The first chamber is formed in the case body. The second chamber is formed in the case body and communicates with the first chamber.

The warning unit is mounted in the second chamber and has a selection module, multiple adjusting modules, a sounding body, and a cover body. The selection module is mounted in the second chamber, rotatable relative to the case body and has multiple accommodating portions formed in the selection module. One of the accommodating portions communicates with the second chamber. The adjusting modules are respectively mounted in and communicate with the accommodating portions. The sounding body is mounted on the selection module and communicates with the accommodating portions. The cover body is mounted on the selection module, covers the selection module and has a least one sound hole communicating with the sounding body.

Other objectives, advantages and novel features of the present invention will become more apparent from the following detailed description when taken in conjunction with the accompanying drawings.

DETAILED DESCRIPTION OF PREFERRED EMBODIMENT

Figure 1:
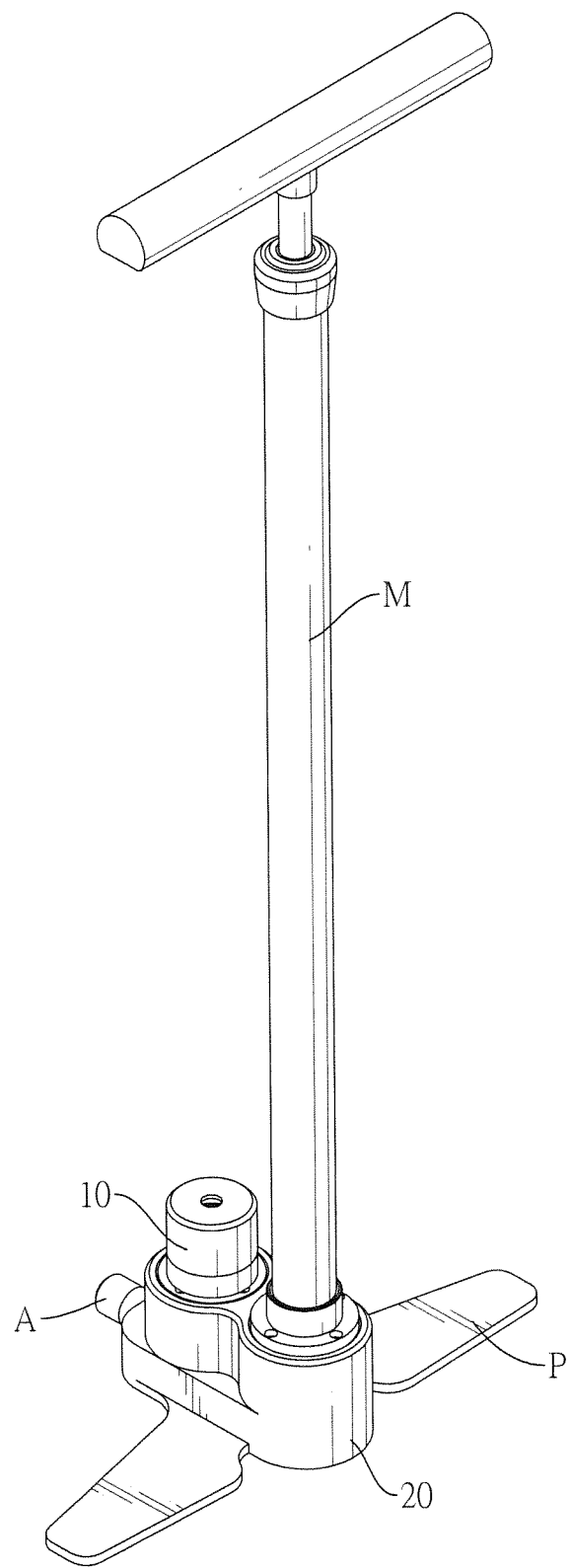
FIG. 1 is a perspective view of a first preferred embodiment of an adapter assembly in accordance with the present invention mounted on a piston module of an inflating device.

With reference to FIG. 1, a first preferred embodiment of an adapter assembly in accordance with the present invention has a warning unit 10 and a case body 20.

Figure 2A:
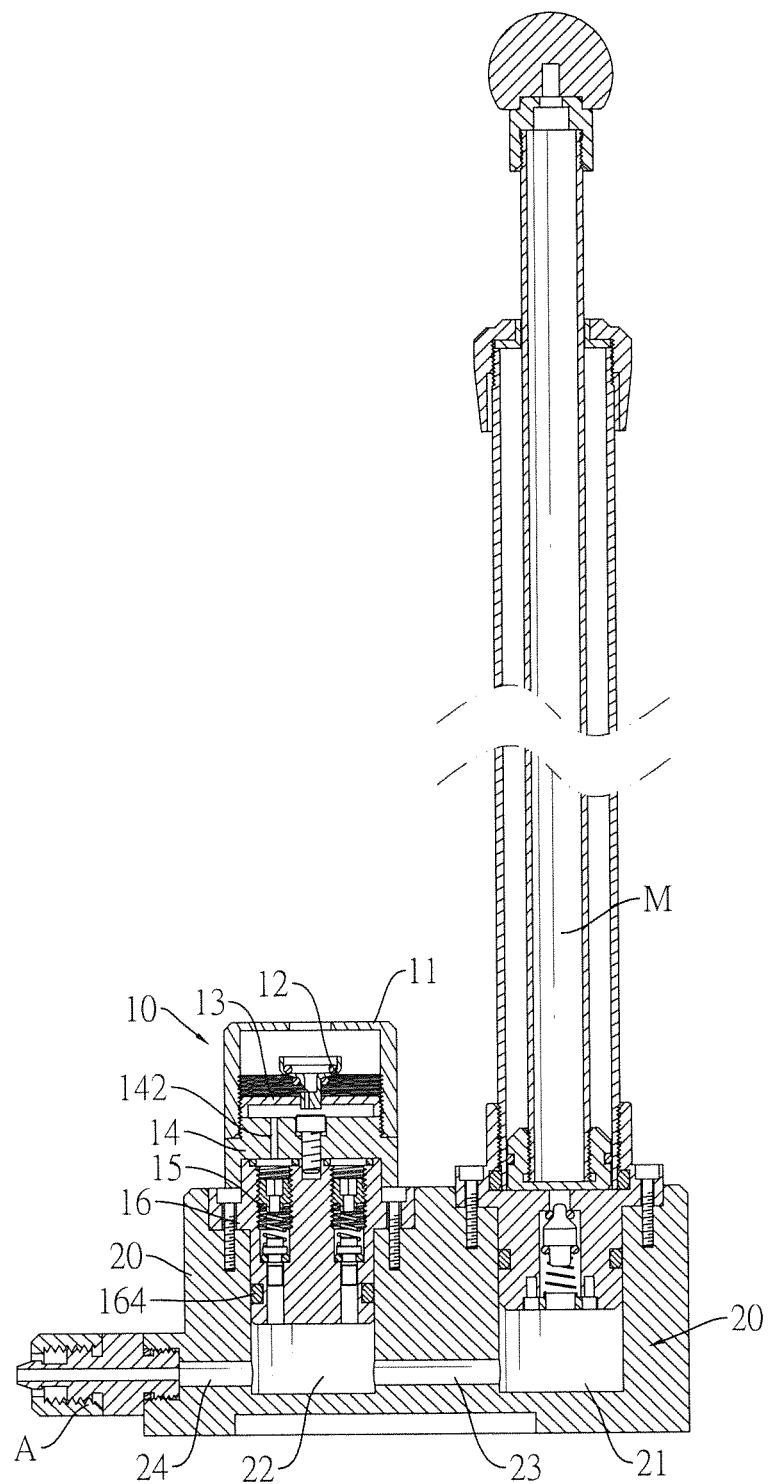
FIG. 2A is a side view in partial section of the inflating device in FIG. 1.
Figure 2B:
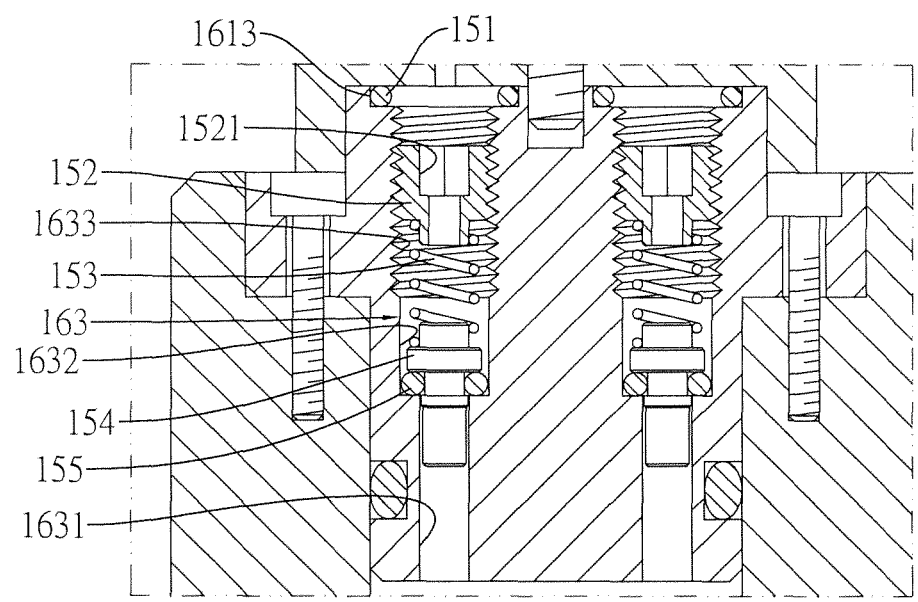
FIG. 2B is an enlarged side view in partial section of the inflating device in FIG. 2A.
Figure 3:
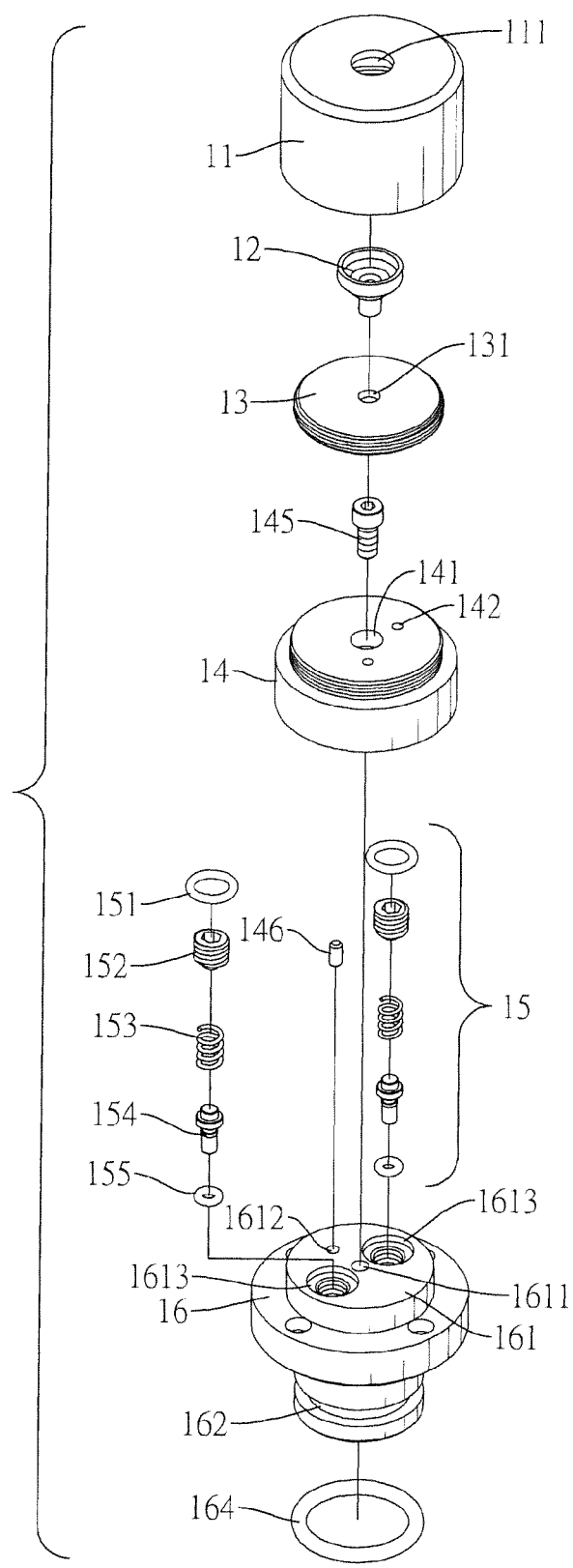
FIG. 3 is an enlarged exploded perspective view of the adapter assembly in FIG. 1.
Figure 4:
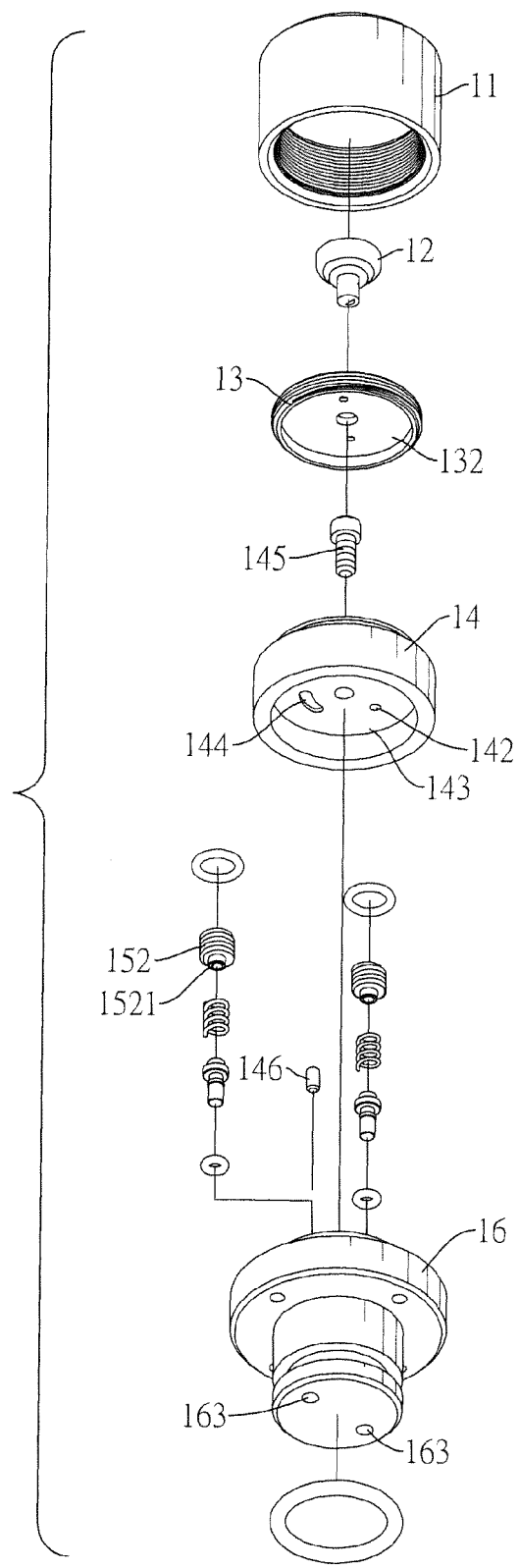
FIG. 4 is another enlarged exploded perspective view of the adapter assembly in FIG. 1.

With reference to FIGS. 2 to 4, the warning unit 10 has a cover body 11, a sounding body, a selection module, and multiple adjusting modules 15. Preferably, the inflatable adapter device has two adjusting modules 15.

The cover body 11 has an opening formed in an end of the cover body 11 and communicates with an inner space of the cover body 11. The cover body 11 further has a sound hole 111 formed through an end of the cover body 11 at a position opposite to the opening of the cover body 11. The cover body 11 further has a thread formed on an inner surface of the cover body 11.

The sounding body is mounted in the cover body 11 and has a sounding unit 12 and a supporting unit 13. The sounding unit 12 is hollow and is mounted in the cover body 11. Preferably, the sounding unit 12 may be a whistle. When air passes through the sounding unit 12, the sounding unit 12 can sound. The supporting unit 13 is mounted in the cover body 11, and the sounding unit 12 is mounted in the cover body 11 by the supporting unit 13. The supporting unit 13 has a thread formed on an outer surface of the supporting unit 13, an mounting hole 131 and a first recess portion 132. The thread of the supporting unit 13 is screwed with thread of the cover body 11. The mounting hole 131 is formed through the supporting unit 13, wherein the sounding unit 12 is inserted into the mounting hole 131. The first recess portion 132 is formed in a side of the supporting unit 13. The sounding unit 12 has an inner space formed through the sounding unit 12 and communicating with the mounting hole 131.

The selection module is mounted on bottoms of the cover body 11 and the supporting unit 13 and has a selection unit 14 and an assembling base 16. The selection unit 14 is mounted on the bottom of the cover body 11 and has a thread, a through hole 141, multiple air holes 142, a second recess portion 143, and a limiting hole 144. The thread of the selection unit 14 is formed on an outer side of the selection unit 14 and is screwed with the thread of the cover body 11. The through hole 141 is formed through an end of the selection unit 14, wherein the end of the selection unit 14 abuts the supporting unit 13. The air holes 142 are formed through the end of the selection unit 14 and communicating with the first recess portion 132. Preferably, the selection unit 14 has two air holes 142. The second recess portion 143 is formed in an end of the selection unit 14 at a position opposite to the through hole 141. The limiting hole 144 is formed in the selection unit 14 and communicates with the second recess portion 143. The limiting hole 144 may be curved. The selection unit 14 further has a fixing unit 145 and a limiting pin 146. The liming pin 146 is slidably mounted in the limiting hole 144.

Figure 5:
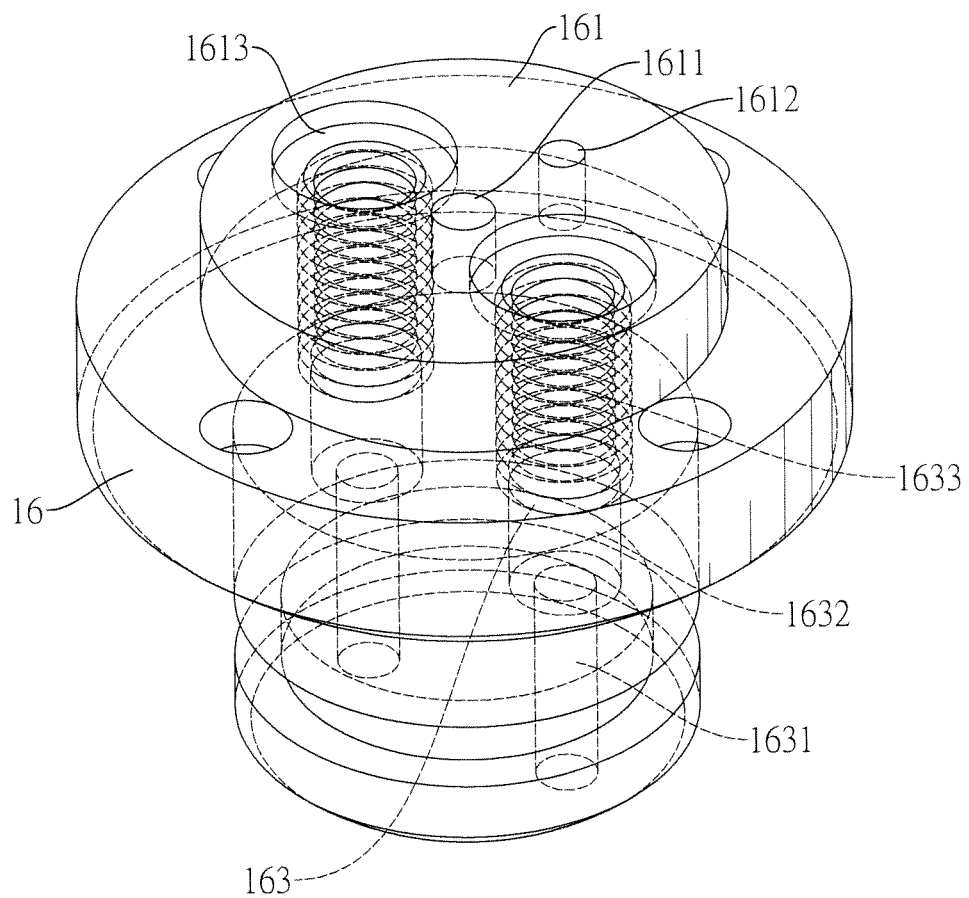
FIG. 5 is an enlarged perspective view of an assembling base of the adapter assembly in FIG. 3.

With reference to FIGS. 3 and 5, the assembling base 16 is mounted on the bottom of the selection unit 14 and has a platform 161, an annular recess 162, multiple accommodating portions 163, a sealing ring body 164. The platform 161 is formed on a first end of the assembling base 16 and mounted in the bottom of the selection unit 14. The platform 161 has a fixing hole 1611, an assembling hole 1612, and multiple recesses 1613. The fixing hole 1611, the assembling hole 1612 and the recesses 1613 are formed in the platform 161. The recesses 1613 are respectively aligned with the air holes 142 and are sheltered by the selection unit 14. The limiting pin 146 is mounted in the assembling hole 1612. Preferably, the assembling base 16 has two recesses 1613 and two accommodating portions 163. The fixing unit 145 is mounted into the through hole 141 and the fixing hole 1611. The annular recess 162 is annularly formed in an outer surface of the assembling base 16 and is adjacent to a second end opposite to the first end of the assembling base 16.

The accommodating portions 163 are formed in the second end of the assembling base 16. Each one of the accommodating portions 163 has a first hole portion 1631, a second hole portion 1632, and a third hole portion 1633. The first hole portion 1631 is formed through the second end of the assembling base 16, communicates with the second hole portion 1632. The third hole portion 1633 communicates with an end of the second portion 1632 opposite to the first hole portion 1631. The third hole portions 1633 respectively communicates with the recesses 1613. Each one of the third hole portions 1633 has a thread formed on an inner surface of the third hole portion 1633. The sealing ring body 164 is mounted in the annular recess 162.

With reference to FIGS. 2 to 5, the adjusting modules 15 are respectively mounted in the recesses 1613 and the accommodating portions 163. Each one of the adjusting modules 15 has a first sealing ring 151, a second sealing ring 155, an abutting unit 154, an elastic unit 153, and an adjusting unit 152. The first sealing ring 151 is mounted in the recess 1613 and abuts a bottom surface of the second recess portion 143. The second sealing ring 155 is mounted in a bottom of the second portion 1632 and is adjacent to the first hole portion 1631. The abutting unit 154 may be a stick body. The abutting unit 154 is mounted in the second portion 1632 and the first hole portion 1631 and has a flange formed annularly on the abutting unit 154 and abutting the bottom of the second sealing ring 155. The elastic unit 153 is elastic, is mounted in the second portion 1632 and the third hole portion 1633 and is mounted around an end of the abutting unit 154. Preferably, the elastic unit 153 may be a compressing spring. The adjusting unit 152 is screwed with the thread of the third hole portion 1633 and abuts an end of the elastic unit 153 at a position opposite to the abutting unit 154. The adjusting unit 152 has an adjusting unit hole 1521 and an outer thread. The adjusting unit hole 1521 is formed through the adjusting unit 152 and communicates with the accommodating portion 163. The outer thread is formed on an outer surface of the adjusting unit 152 and is screwed with the thread of the third hole portion 1633.

With reference to FIG. 2, the case body 20 is mounted on a bottom of the warning unit 10 and has a first chamber 21, a second chamber 22, a first channel 23 and a second channel 24. The first chamber 21 and the second chamber 22 are formed in a top of the case body 20. The first channel 23 is formed in the case body 20 and communicates between the first chamber 21 and the second chamber 22. The second channel 24 is formed in the case body 20, formed through a side of the case body 20 and communicates with the second chamber 22. The assembling base 16 of the warning unit 10 is mounted in the second chamber 22. The sealing ring body 164 abuts an inner surface of the second chamber 22.

With reference to FIGS. 1 and 2, in use, a piston module M is mounted in the first chamber 21 of the case body 20. A pair of pedals P is mounted on two sides of the case body 20. A user steps on the pair of pedal P and holds the piston module M. The piston module M is operated up and down relative to the case body 20 by the user to compressed air. The air is transported sequentially from the first chamber 21, the first channel 23, the second chamber 22 to the second channel 24. A connector A is mounted on the second channel 24 to connect between an inflatable product and the case body 20.

With reference to FIGS. 3 to 5, when a pressure of the air is exceeded, an elastic force of the elastic unit 153 forcing on the abutting unit 154 can be overcome, such that the abutting unit 154 can move upward. The air can flow into the accommodating portions 163, the adjusting unit hole 1521 of the adjusting unit 152, and the air holes 142. Then, the air can flow into the sounding unit 12 and finally flow out of the warning unit 10 from the sound hole 111. When the air flows through the sounding unit 12, the air can drive the sounding unit 12 to sound.

A position of the adjusting unit 152 relative to the third hole portion 1633 can be adjusted by the user. When the position of the adjusting unit 152 is moved downward, the adjusting unit 152 can force the elastic unit 153 downward to further against the pressure of the air. The adjusting units 152 can respectively be adjusted to locate at different positions on different heights, such that the adjusting modules 15 can have different pressure limits, such as: 100 psi, 150 psi, 200 psi, and so on. The user can rotate the selection unit 14, such that one of the air holes 142 can be aligned with one of the recesses 1613 and communicates with the corresponding adjusting unit hole 1521. Therefore, the selection unit 14 can be rotated according to the desired pressure limit. A rotating angle of the selection unit 14 can be limited by the liming pin 146.

Figure 6:
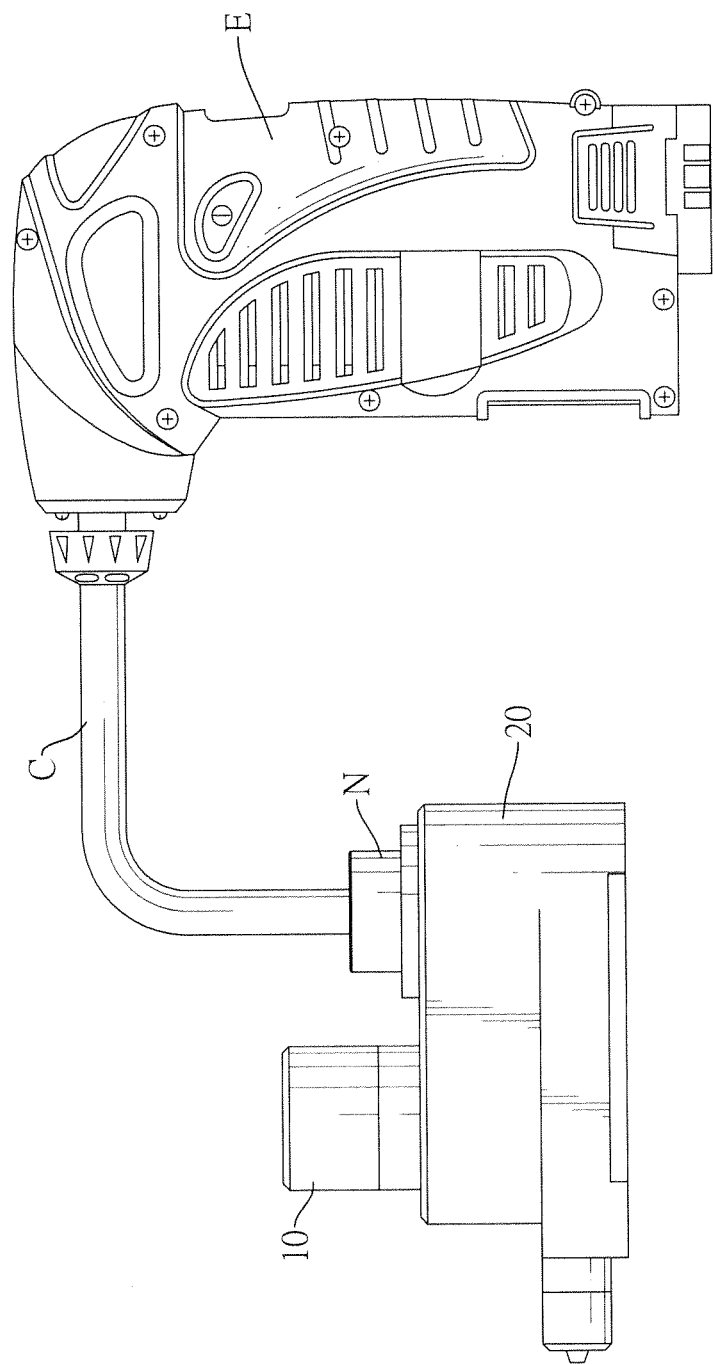
FIG. 6 is an operational side view of the adapter assembly in FIG. 3.

With reference to FIG. 6, in use, the adapter assembly can be assembled on an electrical inflating device to replace a manual inflating manner. A connector C of an electrical inflating pump E is mounted on the first chamber 21 of the case body 20 by an assembling adapter N. When the pressure of the air in the inflatable product is excessive, the warning unit 10 can sound to warn the user.

Figure 7:
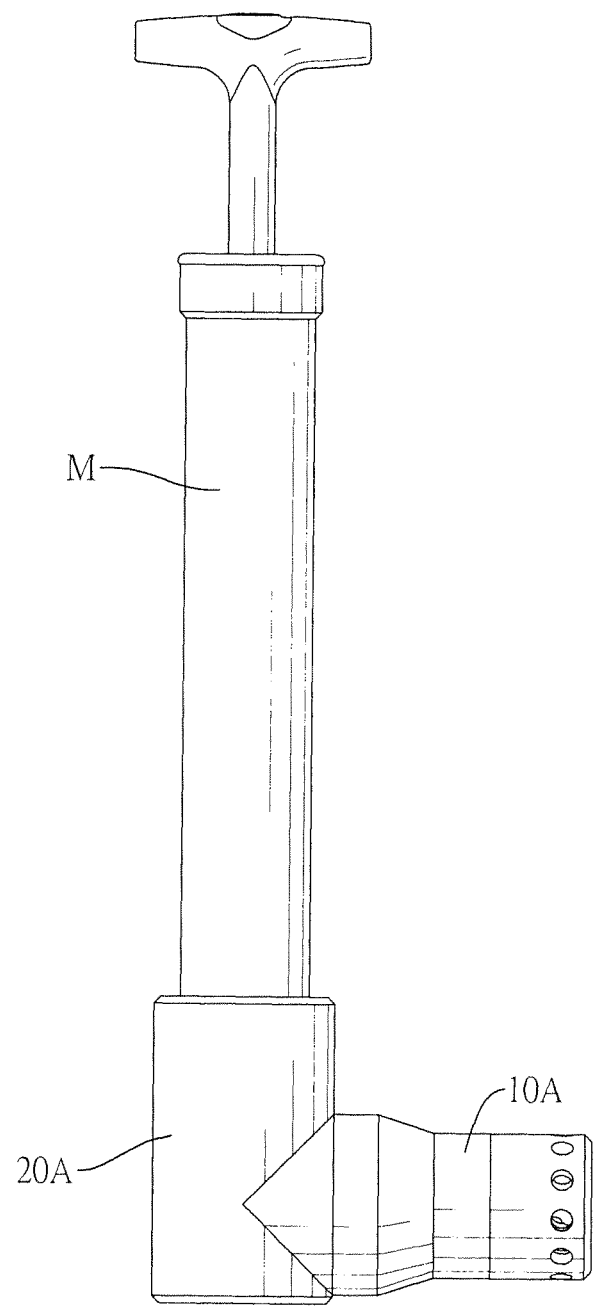
FIG. 7 is a side view of a second preferred embodiment of an adapter assembly in accordance with the present invention mounted on a piston module.
Figure 8:
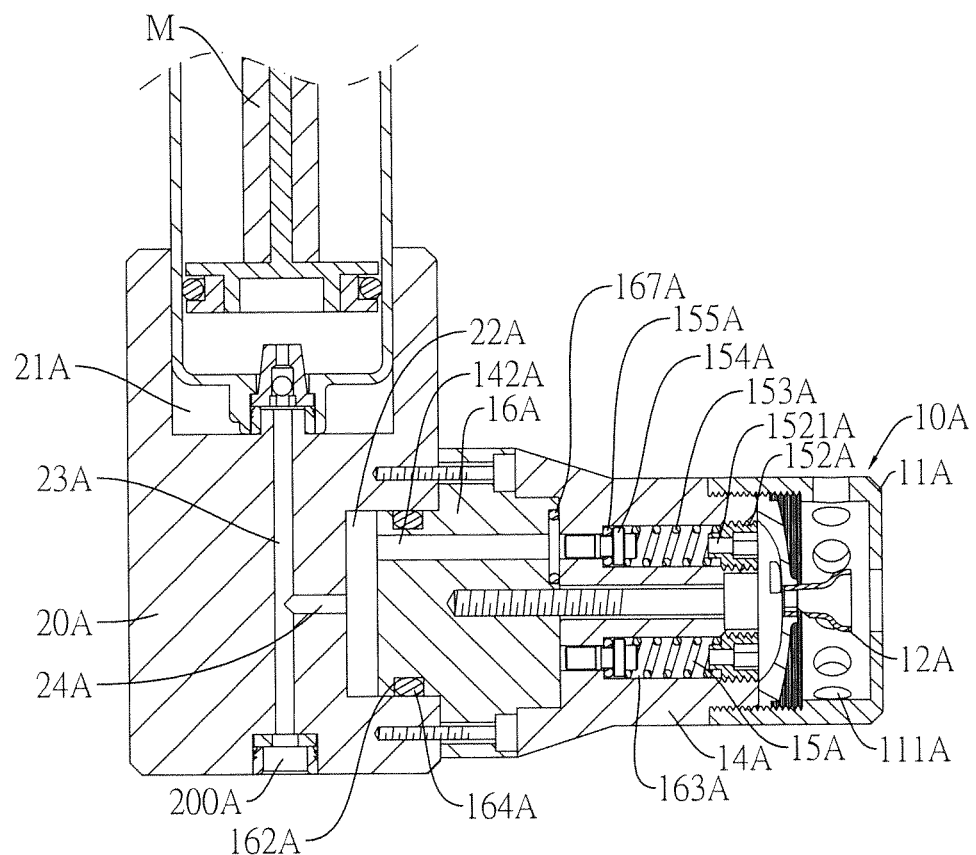
FIG. 8 is an enlarged side view in partial section of the adapter assembly in FIG. 7.

With reference to FIGS. 7 and 8, a second preferred embodiment of the inflatable adapter device in accordance with the present invention has a warning unit 10A and a case body 20A.

The case body 20A has a first chamber 21A, a second chamber 22A, a first channel 23A, a second channel 24A, and an outer connector 200A. The first chamber 21A and the second chamber 22A are formed in the case body 20A. The first channel 23A is formed in the case body 20A and communicates with the first chamber 21A. The second channel 24A is formed in the case body 20A and communicates between the second chamber 22A and the first channel 23A. The outer connector 200A is mounted on the case body 20A and communicates with the first channel 23A. The piston module M is mounted in the first chamber 21A. The warning unit 10A is mounted in the second chamber 22A.

Figure 9:
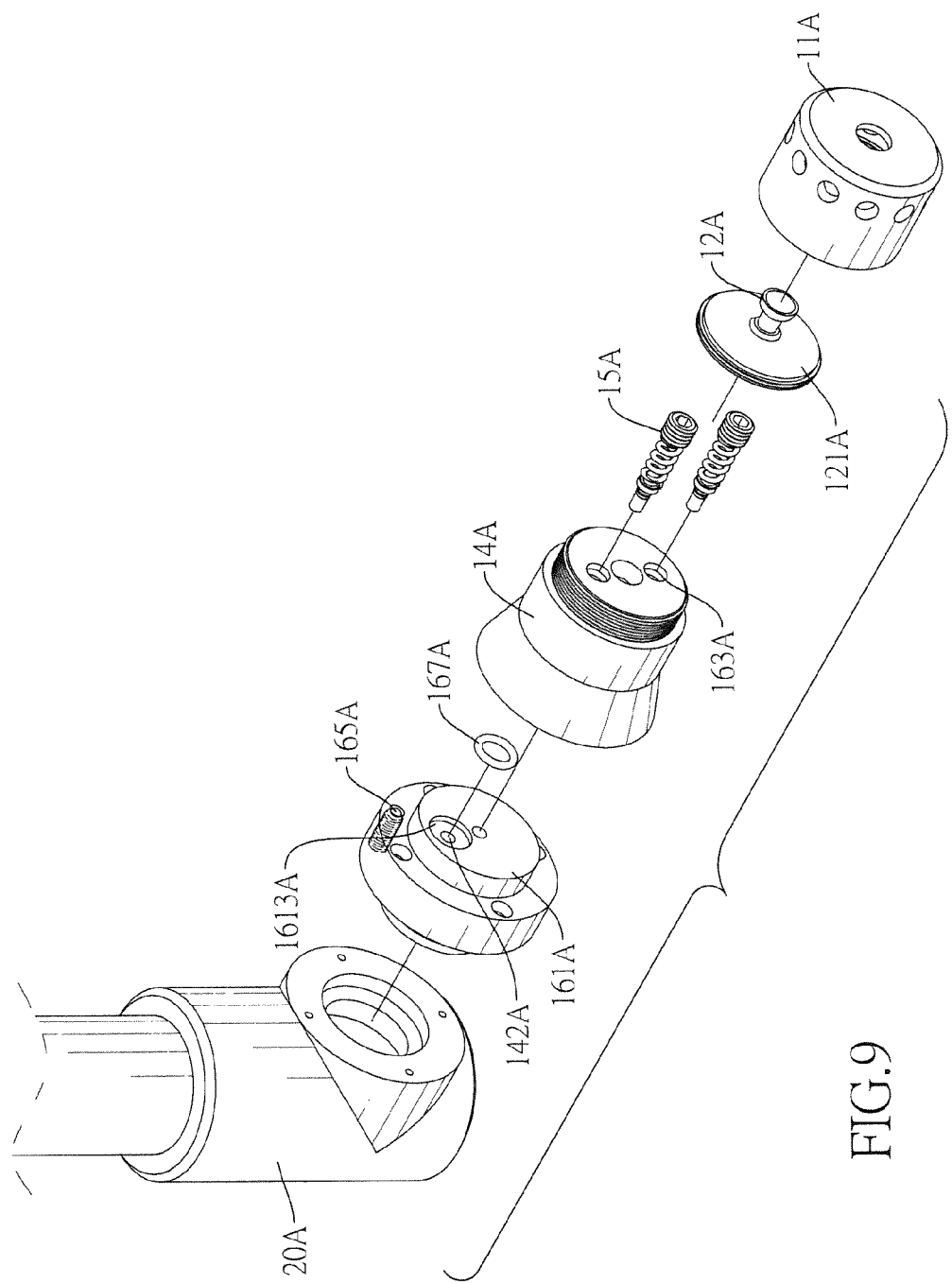
FIG. 9 is an enlarged exploded perspective view of the adapter assembly in FIG. 7.

With reference to FIGS. 8 and 9, the warning unit 10A has a cover body 11A, a sounding body 12A, a selection module, and multiple adjusting units 15A. The cover body 11A has multiple sound holes 111A formed through an end of the cover body 11A and a side wall of the cover body 11A. The sounding body 12A is combined with an inner side of the cover body 11A by threads.

Figure 10:
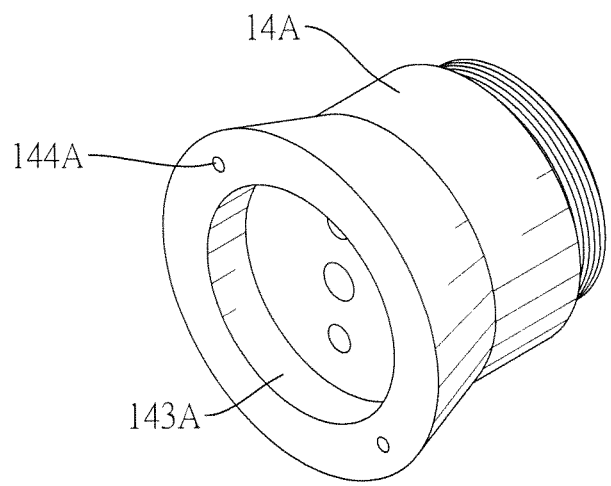
FIG. 10 is an enlarged perspective view of a selection unit of the adapter assembly in FIG. 9.

With reference to FIGS. 8 to 10, the selection module is combined with the inner side of the cover body 11A by threads and has a selection unit 14A and an assembling base 16A. The selection unit 14A abuts the sounding body 12A and has multiple accommodating portions 163A, multiple limiting holes 144A, and a second recess portion 143A. The accommodating portions 163A are formed through the selection module. The limiting holes 144A are formed in an end of the selection module. The second recess portion 143A is formed in end of the selection unit 14A.

With reference to FIGS. 8 and 9, an end of the assembling base 16A is mounted in the second recess portion 143A, and the other end of the assembling base 16A is mounted in the second chamber 22A. The assembling base 16A has a platform 161A, an air hole 142A, an annular recess 162A, a sealing ring body 164A, a first sealing ring 151A, and a limiting pin 146A.

The platform 161A is formed on an end of the assembling base 16A and is mounted in the second recess portion 143A. The recess 1613A is formed in the platform portion 161A. The air hole 142A is formed through the assembling base 16A, aligned with the accommodating portion 163A, communicates with the recess 1613A and the accommodating portion 163A. The annular recess 162A is annularly formed in the assembling base 16A. The sealing ring body 164A is mounted in the annular recess 162A. The first sealing ring 151A is mounted in the recess 1613A and abuts the second recess portion 143A. The limiting pin 146A is mounted in the assembling base 16A and selectively engaged with one of the limiting holes 144A.

The adjusting units 15A is mounted in the accommodating portions 163A and has a second sealing ring 155A, an abutting unit 154A, an elastic unit 153A, and an adjusting unit 152A.

The second sealing ring 155A is mounted in and abuts the accommodating portions 163A. The abutting unit 154A is mounted in the accommodating portions 163A and abuts the second sealing ring 155A. The elastic unit 153A is mounted in the accommodating portions 163A, mounted around an end of the abutting unit 154A and abuts the abutting unit 154A. The adjusting unit 152A is combined with the accommodating portions 163A by threads and abuts an end of the elastic unit 153A at a position opposite to the abutting unit 154A. The adjusting unit 152A has an adjusting unit hole 1521A formed through the adjusting unit 152A, communicates with the accommodating portion 163A and the sounding body 12A.

In use, the selection unit 14A can be rotated by the user, such that the air hole 142A can selectively aligned with one of the accommodating portions 163A. The user can rotate the selection unit 14A to let the limiting pin 146A to selectively engage with one of the limiting holes 144A and further check a position of the selection unit 14A. Positions of the adjusting unit 152A relative to the election unit 14A can be adjusted, such that the elastic units 153A can respectively against different pressures of the air.

In use, when air passes through the air hole 142A, the accommodating portions 163A, the adjusting unit hole 1521A and the sounding body 12A, the sounding body 12A can be driven to sound to warn the user.

Alternatively, the adapter assembly may have four adjusting units 15A, four accommodating portions 163A, and four limiting holes 144A.

Figure 11:
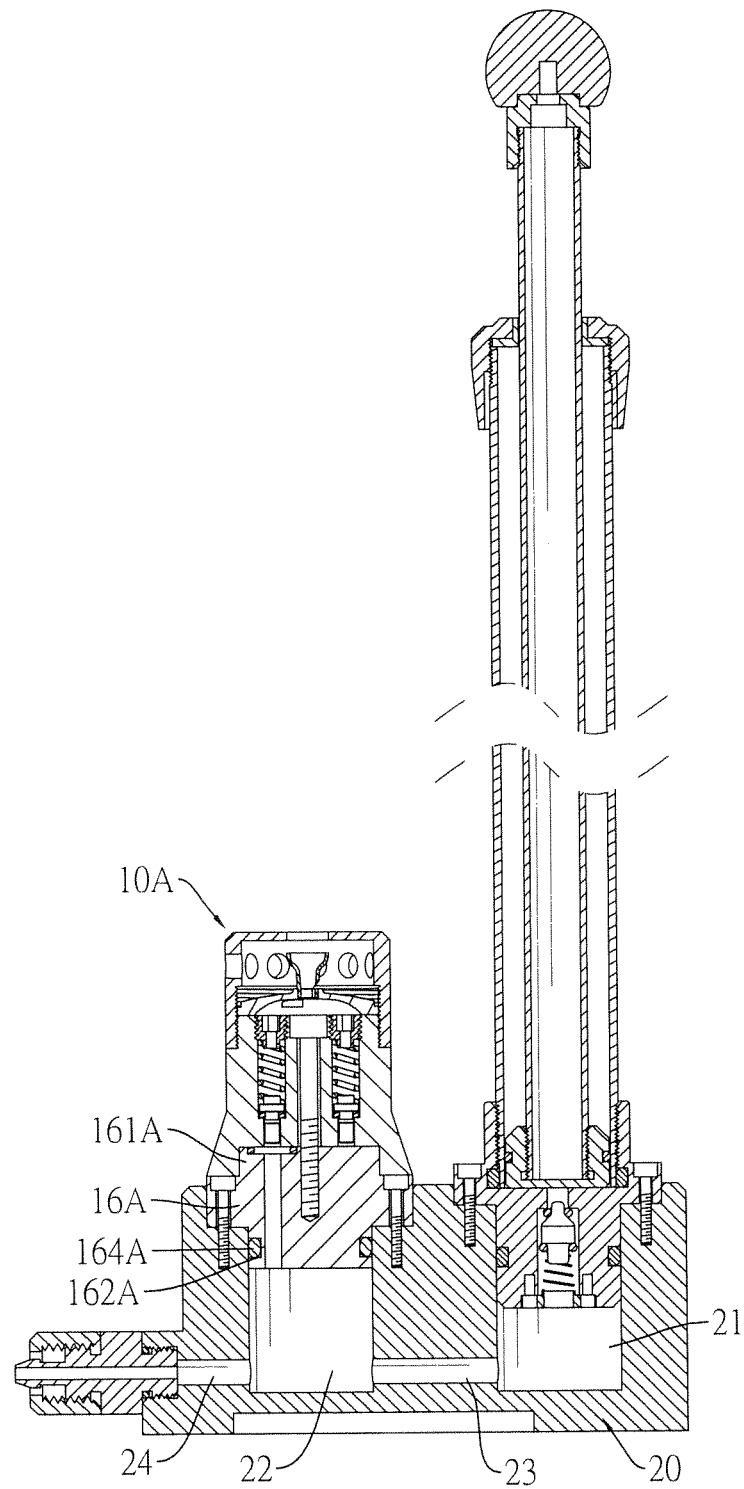
FIG. 11 is a side view in partial section of a third preferred embodiment of an adapter assembly in accordance with the present invention mounted on a piston module.

With reference to FIG. 11, a third preferred embodiment of the adapter assembly in accordance with the present invention has the warning unit 10A and the case body 20. The assembling base 16A of the warning unit 10A is mounted in the second chamber 22 of the case body 20.

From the above description, it is noted that the present invention has the following advantages: The adjusting modules 15, 15A can be adjusted for against different air pressure, and the selection unit 14, 14A can be rotated according to a demand of the user. The air hole 142, 142A can selectively aligned with and communicate with one of the adjusting module 15, 15A. Therefore, when the air hole 142, 142A is aligned with different adjusting modules 15, 15A, the sounding body can sound for different air pressure. Then, the inflatable adapter device can be mounted on a manual or an electrical piston module M depending on the demand of the user. When the adapter assembly is applied for inflating an inflatable product, the sounding body can sound instantly while the air pressure is excessive. Furthermore, the inflatable product can be protected from damaged because of excessive air pressure.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. An adapter assembly for an inflating device having:
   a case body having
      a first chamber formed in the case body; and
      a second chamber formed in the case body and communicating with the first chamber; and
   a warning unit mounted in the second chamber and having
      a selection module mounted in the second chamber, rotatable relative to the case body and having
         multiple accommodating portions formed in the selection module and one of the accommodating portions communicating with the second chamber;
         multiple adjusting modules respectively mounted in and communicating with the accommodating portions;
      a sounding body mounted on the selection module and communicating with the accommodating portions; and
      a cover body mounted on the selection module, covering the selection module and having at least one sound hole communicating with the sounding body.
2. The adapter assembly as claimed in claim 1, wherein the selection module has
   an assembling base mounted in the second chamber, wherein the accommodating portions are formed in the assembling base; and a selection unit rotatably mounted on the assembling base and having an air hole formed through the selection unit and selectively communicating with the sounding body, one of the accommodating portions and a corresponding one of the adjusting modules.

3. The adapter assembly as claimed in claim 1, wherein the selection module has
an assembling base mounted in the second chamber and having an air hole formed through the assembling base and communicating with the second chamber; and
a selection unit rotatably mounted on the assembling base, wherein the accommodating portions are formed in the selection unit, and one of the accommodating portions communicates between the sounding body and the air hole.

4. The adapter assembly as claimed in claim 2, wherein each one of the adjusting modules has
an abutting unit mounted in the corresponding accommodating portion and selectively closing the accommodating portion;
an elastic unit abutting the abutting unit;
an adjusting unit moveably combined with the accommodating portion, abutting the elastic unit at a position opposite to the abutting unit and having an adjusting unit hole formed through the adjusting unit and communicating with the accommodating portion and selectively communicating with the air hole.

5. The adapter assembly as claimed in claim 3, wherein each one of the adjusting modules has
an abutting unit mounted in the corresponding accommodating portion and selectively closing the accommodating portion;
an elastic unit abutting the abutting unit;
an adjusting unit moveably combined with the accommodating portion, abutting the elastic unit at a position opposite to the abutting unit and having an adjusting unit hole formed through the adjusting unit and communicating with the accommodating portion and selectively communicating with the air hole.

6. The adapter assembly as claimed in claim 4, wherein the selection unit further has
a liming hole being curved and formed in the selection unit; and
a limiting pin fixed in the assembling base and slidably inserted into the limiting hole.

7. The adapter assembly as claimed in claim 5, wherein
the assembling base further has a limiting pin mounted in the assembling base; and
the selection unit further has multiple limiting holes formed in the selection unit, wherein the limiting pin is selectively engaged with one of the limiting holes.

8. The adapter assembly as claimed in claim 6, wherein each one of the adjusting modules further has
a first sealing ring mounted in the accommodating portion, wherein the abutting unit selectively abuts the first sealing ring; and
a second sealing ring mounted in the assembling base and abutting between the selection unit and the assembling base, and the second sealing ring is mounted between the accommodating portion and the selection unit.

9. The adapter assembly as claimed in claim 7, wherein each one of the adjusting modules further has
a first sealing ring mounted in the assembling base and abutting between the selection unit and the assembling base; and
a second sealing ring mounted in the accommodating portion, wherein the abutting unit selectively abuts the first sealing ring.

10. The adapter assembly as claimed in claim 8, wherein the sounding body has
a supporting unit mounted in the cover body by threads; and
a sounding unit mounted on the supporting unit and communicating with the air hole; and
the cover body is mounted on the selection unit by threads.

11. The adapter assembly as claimed in claim 9, wherein
the sounding body is mounted in the cover body by threads; and
the cover body is mounted on the selection unit by threads.

12. The adapter assembly as claimed in claim 10, wherein the assembling base further has
an annular recess annularly formed in the assembling base; and
a sealing ring body mounted in the annular recess and abutting between the case body and the annular recess.

13. The adapter assembly as claimed in claim 11, wherein the assembling base further has
an annular recess annularly formed in the assembling base; and
a sealing ring body mounted in the annular recess and abutting between the case body and the annular recess.

14. The adapter assembly as claimed in claim 12, wherein the case body further has
a first channel formed in the case body, wherein the first chamber communicates with the second chamber by the first channel; and
a second channel formed in the case body, formed through a side of the case body and communicating with the second chamber.

15. The adapter assembly as claimed in claim 13, wherein the case body further has
a first channel formed in the case body, wherein the first chamber communicates with the second chamber by the first channel; and
a second channel formed in the case body, formed through a side of the case body and communicating with the second chamber.

16. The adapter assembly as claimed in claim 12, wherein the case body further has
a first channel formed in the case body;
a second channel formed in the case body and communicating with the first channel, wherein the first chamber communicates with the second chamber by the first channel and the second channel; and
an outer connector mounted on the case body and communicating with the first channel.

17. The adapter assembly as claimed in claim 13, wherein the case body further has
a first channel formed in the case body;
a second channel formed in the case body and communicating with the first channel, wherein the first chamber communicates with the second chamber by the first channel and the second channel; and
an outer connector mounted on the case body and communicating with the first channel.

* * * * *